W. G. SELBY & JOHN BOWMAN.
Corn-Planters.
No. 127,648. Patented June 4, 1872.
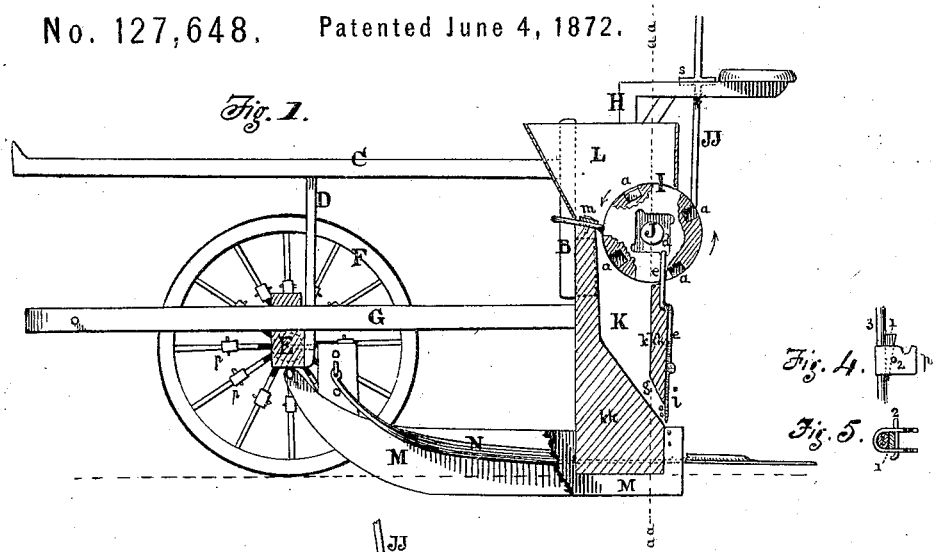
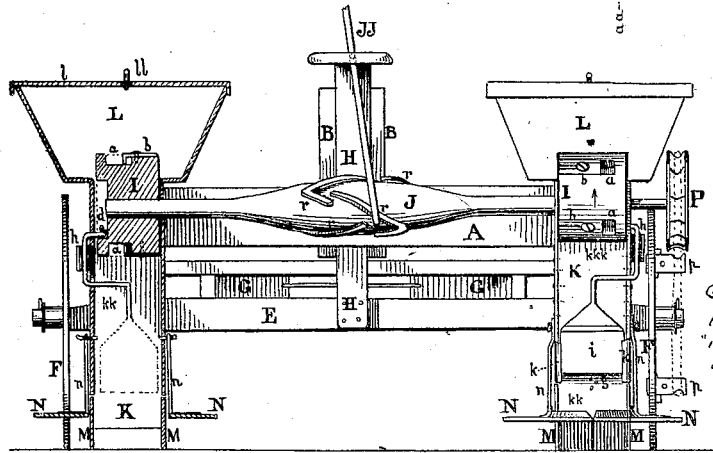
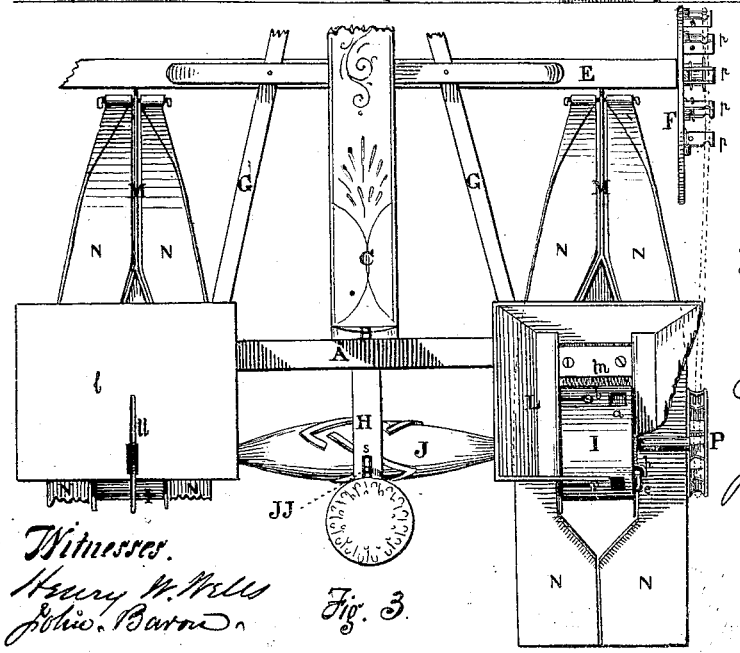

UNITED STATES PATENT OFFICE.

WILLIAM G. SELBY AND JOHN BOWMAN, OF PRINCEVILLE, ILLINOIS.

IMPROVEMENT IN CORN-PLANTERS.

Specification forming part of Letters Patent No. 127,648, dated June 4, 1872; antedated May 25, 1872.

*To all whom it may concern:*

Be it known that we, WILLIAM G. SELBY and JOHN BOWMAN, both of Princeville, in the county of Peoria and in the State of Illinois, have invented an Improvement in Corn-Planters; and do hereby decare that the following is a full, clear, and exact description thereof, reference being had to the annexed drawing making a part of this specification, in which like letters of reference refer to like parts, and in which—

Figure 1 represents a side elevation, with the nearest wheel and the side casing of the dropper-shank and part of the "runner" and "filler" removed; Fig. 2, rear elevation, with vertical section of seed-box, rotating dropper, and shank, as seen in section through the line $a\,a\,a\,a$, Fig. 1. Scale of drawing, three-fourths of an inch to one foot.

Our invention consists in the application of band-carriers to the spokes of the wheel for carrying a band or chain, in combination with a pulley or its equivalent, connecting suitably with the dropping device of a corn-planter, said band-carriers being so constructed and applied to the spokes as that they may be adjusted to increase or lessen the power, as occasion may require; also, in the arrangement of dropping-valves in guides on the outside of the shanks, and their construction with stems to operate in combination with rotary corn-droppers, this arrangement of the valves being more simple and efficient in their operation, and, beside, more easily got at in case of derangement.

A is a transverse horizontal bar which connects the seed-boxes L L; B, upright support running from said bar A upward, to support the rear end of the long central seat C; C, horizontal long seat running above the center of the planter, supported at or near the rear by the brace or support B, and at the other end, or behind the forward end, by an upright brace, D, which is attached to the wheel-axle E at the center, or inserted there into the king-bolt hole, if the axle and fore wheels of a wagon be used; E, wheel-axle; F, wheels. The fore-wheels and axle of a common wagon is intended to be attached to the seed-box and runners for economy. The attachments $p\,p\,p$, &c., to the spokes of one wheel are for carrying a band to rotate the pulley P on the dropper-shaft, hereafter to be described. G, the hounds of wagon-axle E, but are merely shown to illustrate the adaptation of the part of a wagon, as mentioned; H, vertical brace and horizontal cross-piece to carry the lever J J; I I, the rotary corn-droppers, one in each seed-box, each being set on separate ends of the horizontal shaft J. Each dropper has four holes, $a\,a$, &c., in its periphery, the size of which holes is regulated by their respective slotted slides $b\,b$, &c., and the screw in each slot. A row of bristles secured by a plate, $m$, or equivalent, to the upper part of shank K or its back part $k\,k$, is set so that the edge of said bristles formed by their accumulated ends presses against the surface of the revolving dropper. This device for "cutting off" the corn may be substituted by a rubber or other elastic edge. The bristles, plate $m$, in conjunction with the upper surface of the revolving dropper, forms the bottom of the seed-box L L, &c. The back side of each dropper projects through the rear of its respective seed-box, (said box fitting its surface closely, or enough so to retain the corn,) said projection beyond the box being for the purpose of admitting the horizontal end $e$ of the drop-valve $i$ into a recess, $d$, in the center of the outer vertical end of said dropper I I, said dropper being a cylindrical "block" in the model, the better for this exemplification. This recess $d$ is square at the opening, but of no great depth, and has a semicircular recess at each of its four angles, but these are small enough to admit said end $e$ of drop-valve $i$. The recesses are equal in number to the corn-holes $a\,a$, &c., each of which latter are on a separate plane, each plane passing through one of the corn-holes $a\,a$, &c., and an angle of the recess $d$. An ear, $h$, projecting from the side of the shank K, confines the rod $e$ to the outer sides of the recess $d$, and also to a vertical oscillation. The same description applies to both droppers and their accessories. J is the shaft which rotates the droppers I I, and is provided at its middle surface with the inclined strips or "cams" $r\,r$, &c., fastened thereon, each cam having one of its ends "returned" around the end of the next one, which latter is inclined in an opposite direction. There are four of these cams, which also correspond to the number of the corn-holes $a\,a$ in the dropper and the angles of its recess $d$. J J is a vertical lever pivoted in a slot, $s$, on the brace H, its lower end being bent toward the shaft J to enter the space between the cams $r$ $r$, &c. K K are the "shanks," with each one seed-passage, $g$, closed by drop-valve $i$, which latter slides in the cleats on each side of the opening. L L are the seed-boxes, having covers $l$ $l$, each confined by a horizontal rod fastened to the cover, a portion of the rod being bent downward through a slot in the cover to engage with the edge of the seed-box; M M, the "runners," which are attached to the axle E; N N, the "fillers" or "pulverizers," consisting of two horizontal plates, one suspended to and on either side of a runner-shank, K, by means of supports $n$ $n$, and attached at the forward ends to the axle E or to fore part of runner M. P is a pulley on the end of the shaft J, which, in connection with the carriers $p$ $p$, &c., on wheel F, carries a band or chain when the machine is used to drill corn. The band-carriers $p$ $p$, &c., (see Figs. 4 and 5,) are flat pieces of iron bent round each spoke of the wheel, each projecting far enough outward to carry a chain or band in the recess or notch cut in the upper edges of each, and united by a pin, 2, passing through a hole in either arm of "carrier," and held to the spoke by a wedge, 1, driven into the interval between the pin and the spoke.

The operation of this planter is as follows: As before said, the axle and wheels may be substituted by those from the front of a common wagon. The vertical brace D, which carries the long seat C, being inserted into the king-bolt hole, and the runners M M attached by a staple to the axle, the shaft J is rotated by the passage of the end of the lever J J along its cams $r$ $r$, &c., which are so placed that the shaft can be rotated but one way only, or in one direction—i. e., carrying the corn-holes downward to the bristles and plates $m$ $m$. Each motion of the lever carries one hole filled with corn below the cut-off $m$, at the same time bringing another hole into the box L. Said first motion or passage of a hole below the cut-off empties the contained seed into the passage $g$, where it is held by the drop-valve $i$, which, at the next one-fourth revolution of shaft J, said valve lets fall to the soil. The rod $e$ is held or kept against the side of recess $d$ by means of the ears $h$, and is carried up by one of the small recesses in $d$ until the dropper I, in rotating, lets the same fall, and with it the drop-valve $i$. The number of the grains of corn in the seed-holes $a$ $a$, &c., is regulated by the slotted slides $b$ $b$, &c., at each hole, each having a plate which projects into the hole, and forms one side of said hole, and are adjusted by the screw in the said slot. The shaft J is rotated by the passage of the horizontal projection of the lower end of the lever J J along its surface between its cams or inclined guides $r$ $r$, &c., which are so placed that the shaft can rotate one way only—i. e., to bring the holes $a$ $a$, &c., of the droppers I I through the seed in their respective boxes down to the edge of the bristle cut-off $m$. Said holes correspond with the number and position of the cams $r$ $r$, &c., and also with the position of small recesses of the larger recess $d$ in the side of each dropper I I. The "fillers" or pulverizers N N have springs $n$ $n$ on either side of the shank K, which press them downward onto the loose soil to fill the groove excavated by the runners M M, so as to bury the seed.

When it is desired to use this planter as a "corn-drill" the pulley P is connected with the "carriers" $p$ $p$, &c., on the wheel F by a band or chain, and the shaft J and the droppers are thus rotated more rapidly than by the lever J J, and will thus plant the corn as closely as desired.

It will be seen that all the "working parts" of this planter, as the droppers, &c., are visible from the outside of machine, and disarrangements readily detected by the operator. The driver sits in front or shifts himself along the seat C to press the "runners" more into the ground, or to raise them more upward, or to entirely raise them from the soil in turning the machine or in going to or from the field.

What we claim as our invention is—

1. The combination of adjustable band-carriers with the spokes of the wheel for carrying a band or chain, in combination with a pulley, or its equivalent, connecting suitably with the dropping device or devices of a corn-planter, substantially as and for the purpose set forth.

2. The construction of the band-carriers, consisting of iron clasps $p$, wedges $i$, and pins 2, all arranged and applied to the spokes of the wheel, substantially as described.

3. The arrangement of the drop-valves $i$ $i$ in guides $k$ on the outside of the shanks, and their construction with stems $e$ to operate in combination with the rotary corn-droppers I I, substantially as shown and set forth.

In testimony that we claim the foregoing corn-planter we have hereunto set our hands this 5th day of October, 1871.

WILLIAM G. SELBY.
JOHN BOWMAN.

Witnesses:
 R. R. TAYLOR,
 V. WEBER.